United States Patent [19]

Sustare, Jr.

[11] Patent Number: 5,639,963

[45] Date of Patent: Jun. 17, 1997

[54] MULTI-DIRECTIONAL WIND DIRECTION AND SPEED INDICATING APPARATUS

[76] Inventor: George Allan Sustare, Jr., 137 E. Seneca St., Manlius, N.Y. 13104

[21] Appl. No.: 612,442

[22] Filed: Mar. 7, 1996

[51] Int. Cl.$^6$ ....................................... G01F 1/00
[52] U.S. Cl. ............................ 73/170.08; 73/170.07
[58] Field of Search ........................ 73/170.02, 170.05, 73/170.07, 170.3; 116/273, 274

[56] References Cited

U.S. PATENT DOCUMENTS

| | | |
|---|---|---|
| 858,310 | 6/1907 | Sperber . |
| 3,049,008 | 8/1962 | Polser . |
| 3,094,869 | 6/1963 | Wehmann ................... 73/170.08 X |
| 3,119,261 | 1/1964 | Bonanno ..................... 73/170.08 |
| 3,224,268 | 12/1965 | Fenner et al. ................ 73/170.08 |
| 3,713,336 | 1/1973 | Berstein et al. ............. 73/170.08 X |
| 3,986,396 | 10/1976 | Raymond ..................... 73/170.07 |
| 4,152,933 | 5/1979 | Woodhouse . |
| 4,548,074 | 10/1985 | Krueter ....................... 73/170.08 X |
| 4,597,287 | 7/1986 | Thomas . |
| 4,812,844 | 3/1989 | Kallstrom ................... 73/170.08 X |
| 5,231,876 | 8/1993 | Peet, II ........................ 73/170.08 |
| 5,361,633 | 11/1994 | Peet, II ........................ 73/170.08 |

*Primary Examiner*—Elizabeth L. Dougherty
*Attorney, Agent, or Firm*—George R. McGuire

[57] ABSTRACT

A navigational aid location. The for assessing fluid conditions, such as wind, at a predetermined device is comprised of an assembly including a vertically oriented support member, a vaning member rotatably attached to the support member for pivotal movement about a horizontal axis to indicate the vertical components of the fluid, a member attached to the support member for rotation about a vertical axis to indicate the horizontal components of the fluid, and an anemometer operably attached to the support member for indicating lateral wind speed. Alternatively, a second anemometer may be mounted to the vaning member to indicate true wind speed. Also, electrical transmission components may be operatively mounted within the apparatus for relaying the direction/speed data to a remote party.

14 Claims, 12 Drawing Sheets

MULTI-DIRECTIONAL WIND DIRECTION AND SPEED INDICATING APPARATUS

The subject matter of this application is disclosed in U.S. Patent Office Disclosure Documents 380776 and 391962, dated Aug. 25, 1995, and Feb. 5, 1996, respectively, the contents of which are incorporated herein by reference thereto.

BACKGROUND OF THE INVENTION

The present invention generally relates to wind speed measurement and direction indicating apparatus. More particularly, the present invention relates to such apparatus particularly adapted for use by pilots of planes, helicopters, gliders, and hang gliders to provide a visual indication of wind conditions when taking off or landing such a vehicle.

Traditionally, recreational pilots of hang gliders or other flying apparatus determine wind direction and approximate speed by visually observing a wind sock. Conventional wind socks include an opening through which wind blows and expands the sock by an amount proportional to the size and material composition of the wind sock. However, due to their flaccid nature, these wind socks are not responsive to or accurate indicators of changes in the wind's characteristics. Such changes constantly occur near the edge of a cliff where a hang glider may be taking off, or on top of a building where a helicopter may be taking off or landing, or along a runway where wake turbulence from preceding air craft can occur, or where the presence of towers and other objects produce turbulent shearing winds. Thus, while a wind sock may convey to a pilot very general information regarding the wind, they do not provide an accurate indicator in areas where turbulence may create constantly changing wind characteristics.

Although almost exclusively used by hang gliding enthusiasts, wind socks are particularly inaccurate, and potentially dangerous. Hang gliding requires a pilot to launch from the top of a ridge or from the ledge of a cliff, the wind characteristics near the cliff need to be known for absolute efficiency and success in taking off. "Ridge lift" is the phrase used to describe certain wind characteristics that can occur near a hill or cliff. As the air mass passes over the hill, the air in contact with the hill's vertical surface is compressed and forced up and over the contour of the land. This air mass is what pilots launch into, and of course it is necessary to launch when the air mass is lifting and not sinking.

A wind sock (or simple cloth streamer) is anchored at one end with their remaining portions hanging free from the anchored end. The free end of the streamer/sock has the compressed air coming up the hill or off of the ledge passing both thereunder and thereover. If the compressed air passing under the streamer/sock is stronger than the air passing over the streamer/sock, then it will indicate the wind direction only, not the presence of lifting or sinking air. Due to the fact that streamers/socks are not statically balanced, the only indication given is wind direction when in fact the air mass may actually be sinking or lifting. These characteristics are impossible to assess from wind direction only. However, due to gravity's effect on the free end, the lift must be substantially greater than what is required to takeoff in order for it to be indicated by the streamer/sock. Hence, since the hang gliders need the optimum lift present in the air after they've launched, the streamer/sock may have indicated the optimum direction when it was over land, not out in front of the land. Therefore, the streamer/sock may be indicating optimum direction, but due to the necessary strength of the wind for the streamer/sock to so indicate, and the rapidly changing characteristics of the wind in the presence of a cliff, the air mass being launched into may actually be sinking. Thus, when a streamer/sock indicates adequate takeoff conditions, in reality the hang glider may rapidly sink to the ground.

In addition to knowing wind direction characteristics, it is also important to know wind speed. When launching a hang glider, the speed of the wind is generally estimated based on how full the wind sock gets. However, due to the previously discussed inaccuracies with wind socks, the actual wind speed is probably far from the speed estimated. Therefore, anemometers are utilized where wind speed must be accurately determined. Thus, wind speed and wind direction need different instrumentation to provide an accurate qualitative assessment thereof. U.S. Pat. No. 4,152,933 to Woodhouse on May 8, 1979 describes a system incorporating such features.

Accordingly, it is therefore a principal object of the present invention to provide a new and improved device which accurately provides a qualitative assessment of both wind direction characteristics and wind speed.

It is a further object of the present invention to provide wind speed and direction indicating device capable of providing pilot of a hang glider with means for assessing optimum takeoff conditions.

It is another object of the present invention to provide wind speed and direction indicating device which provides anyone with accurate information regarding all dimensions of the wind directions.

It is still a further object of the present invention provide a wind speed and direction indicating device which can easily transportable.

It is yet an additional object of the present invention provide a wind speed and direction indicating device which durable and resistant to UV degradation.

It is another object of the present invention to provide wind speed and direction indicating device which provides safer equipment for all pilots.

Other objects and advantages of the present invention will in part be obvious and in part appear hereinafter.

SUMMARY OF THE INVENTION

In accordance with the foregoing objects and advantages, the present invention provides a wind speed and direction indicating device for assisting pilots in making qualitative assessments of wind conditions, and aiding them in their navigation. The device includes a dynamically balanced wind vaning member capable of indicating lateral and vertical components of the wind's direction, as well as an anemometer for accurately determining the wind's speed. The device may also be equipped with telemetry equipment, i.e., sensors, transmitters, amplifiers and antennas, for relaying the wind information to a radio control tower or directly to a pilot. Also, large scale units can be permanently mounted at predetermined locations, and smaller scale units can be easily transported and set up at any desired location.

The device is essentially comprised of a main support rod adaptively formed to be positioned in a vertical orientation on the ground, and first, second and third means for indicating vertical, horizontal, and speed components of the wind, respectively. The main support rod is comprised of a cylindrically shaped upper mounting bracket which is rotatably mounted (about its longitudinal axis) to a fixed support rod. The vertical and horizontal (along either the Y or Z axes of a conventional X-Y-Z cartesian coordinate system) components of the wind are indicated by first and second shafts, respectively, mounted along a common longitudinal axis for both horizontal (yaw) and vertical (pitch) rotation about the mounting bracket, and hence the support rod, by a universal joint. The first shaft terminates in a blunt end, and the second shaft includes a plurality of aerodynamically shaped fins positioned equidistantly, radially therearound. The first and second shafts are bridged by a cylindrically shaped tube into which both rods securely fit. It is this tube that is universally pivotally attached to the support rod.

The first shaft is releasably attached to the tube by means an adjustment screw which passes radially through the tube and securely engages the first shaft. As the first shaft is used essentially for its counter-balancing of the second shaft, the distance it may extend out of the tube is selectively adjustable to provide the proper amount of counter-balance for a given circumstance. The second shaft is fixed within the tube by the universal joint's pivot pin which extends through both the tube and the second shaft. The pivot pin is a rivot to ensure that it doesn't fall out of engagement with the tube and shaft. The rivet may incorporate a sleeve bearing for friction free movement.

The wind speed is indicated by a conventional, cup-type anemometer. In one embodiment, the anemometer is rotatably mounted to the fixed support rod, thereby being able to determine lateral wind speed (the speed of the lateral, or horizontal, component of the wind). In a second embodiment, an anemometer is mounted to the tube which bridges the direction indicating shafts, thereby making it pivotal with respect to the support rod and fixed with respect to the direction indicating shafts. This anemometer will therefore accurately determine the true wind speed. In a third embodiment, both anemometers described in the previous two embodiments are included. This will provide a pilot with a reading of both the true wind speed and the lateral wind speed. This arrangement is useful as a pilot can make proper adjustments to compensate for the true wind speed, and the shearing effect produced by the lateral or vertical component of the wind.

All embodiments of the present invention can be equipped with telemetry equipment to transmit readings of the wind's direction (all components) and speed (both lateral and true) to a control tower or directly to a pilot. Conventional sensors and transmitters are appropriately attached to the various members of the device to provide actual readouts, and the sensors can be hardwired to an RF transmitter (transponder) also appropriately positioned on the device so the information can be sent to the receiving party—ultimately the pilot.

The device may be permanently mounted at a predetermined location along the ledge of a cliff (for use by hang gliders), a plurality may be mounted along an airport runway in the landing approach patterns of power air craft, or several may be mounted at a heliport. Also, a transportable, smaller scale model of the device may be utilized by a hang gliding enthusiast who may mount the device along the ledge of any takeoff point desired. For use by the hang glider, by observing the wind's lateral and vertical components, in addition to the wind's speed, the optimum launch moment is easily ascertained. Thus, no hang glider will launch into sinking or laminar flowing air due to inaccurate wind measuring equipment.

BRIEF DESCRIPTION OF THE DRAWINGS

The present invention will be better understood and more fully described when taken in light of the accompanying drawing figures wherein.

DETAILED DESCRIPTION

Figure 1:
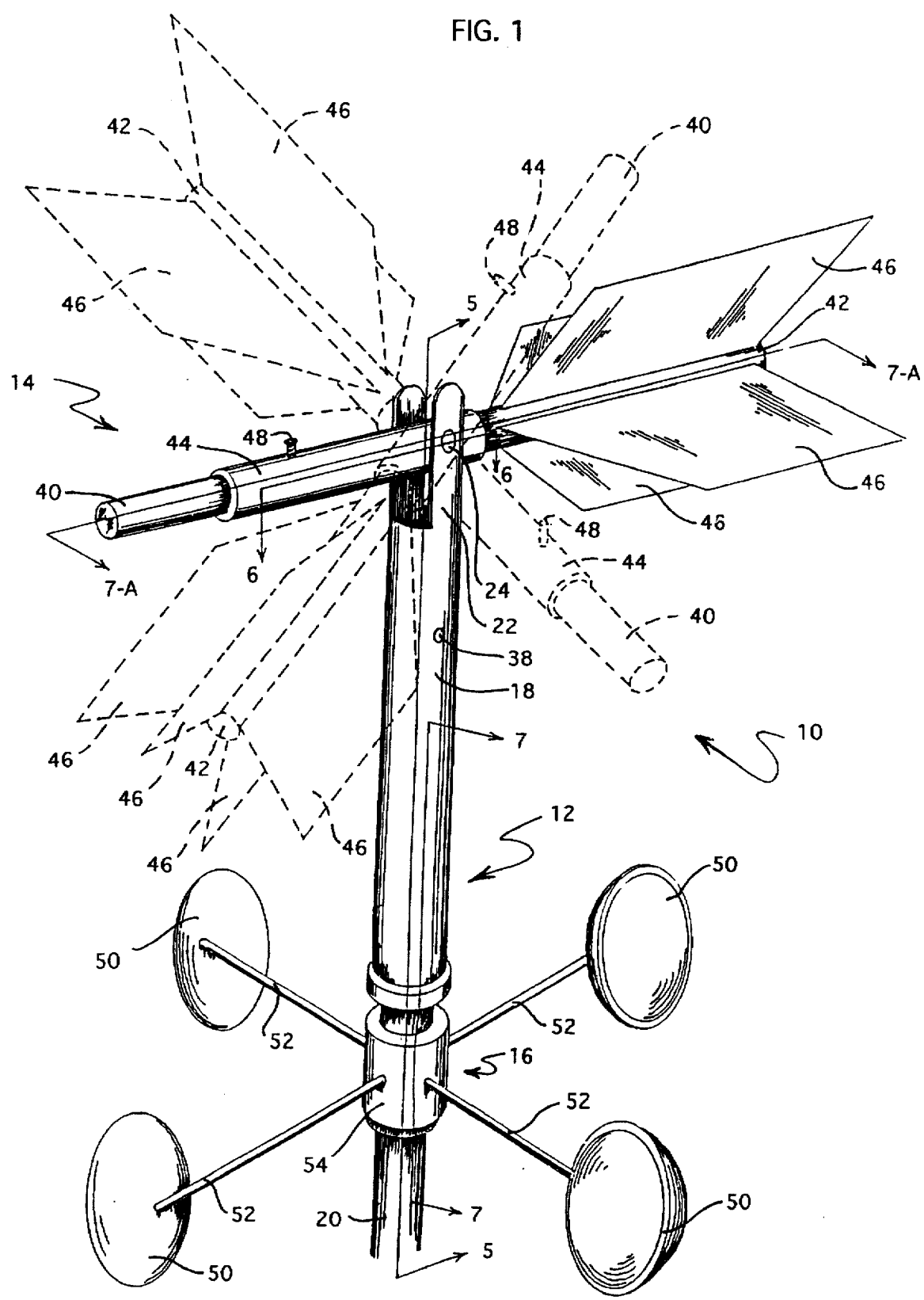
FIG. 1 is a perspective view of the present invention showing, in phantom, the wind direction indicators in various orientations.
Figure 2:
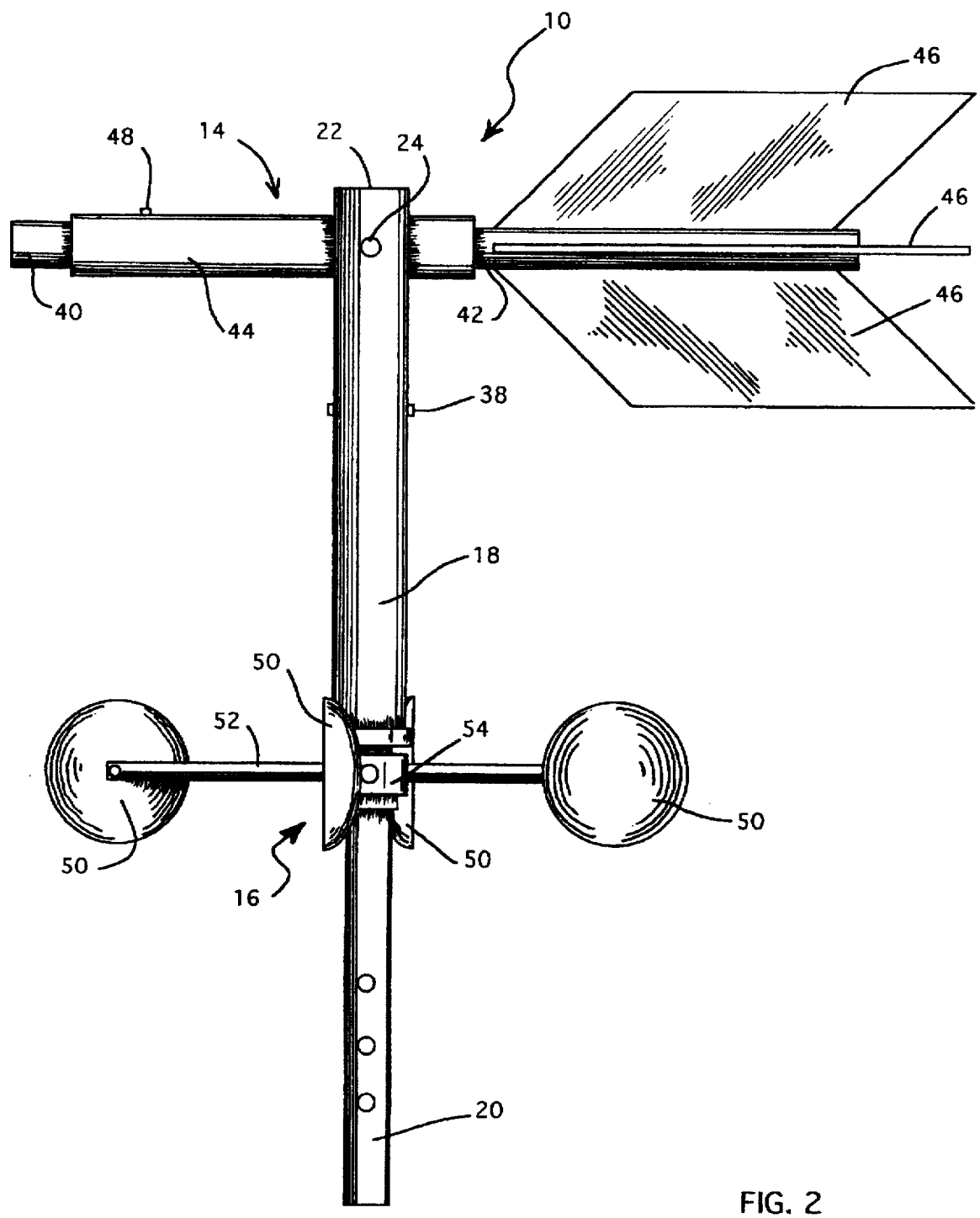
FIG. 2 is a side elevational view thereof.
Figure 3:
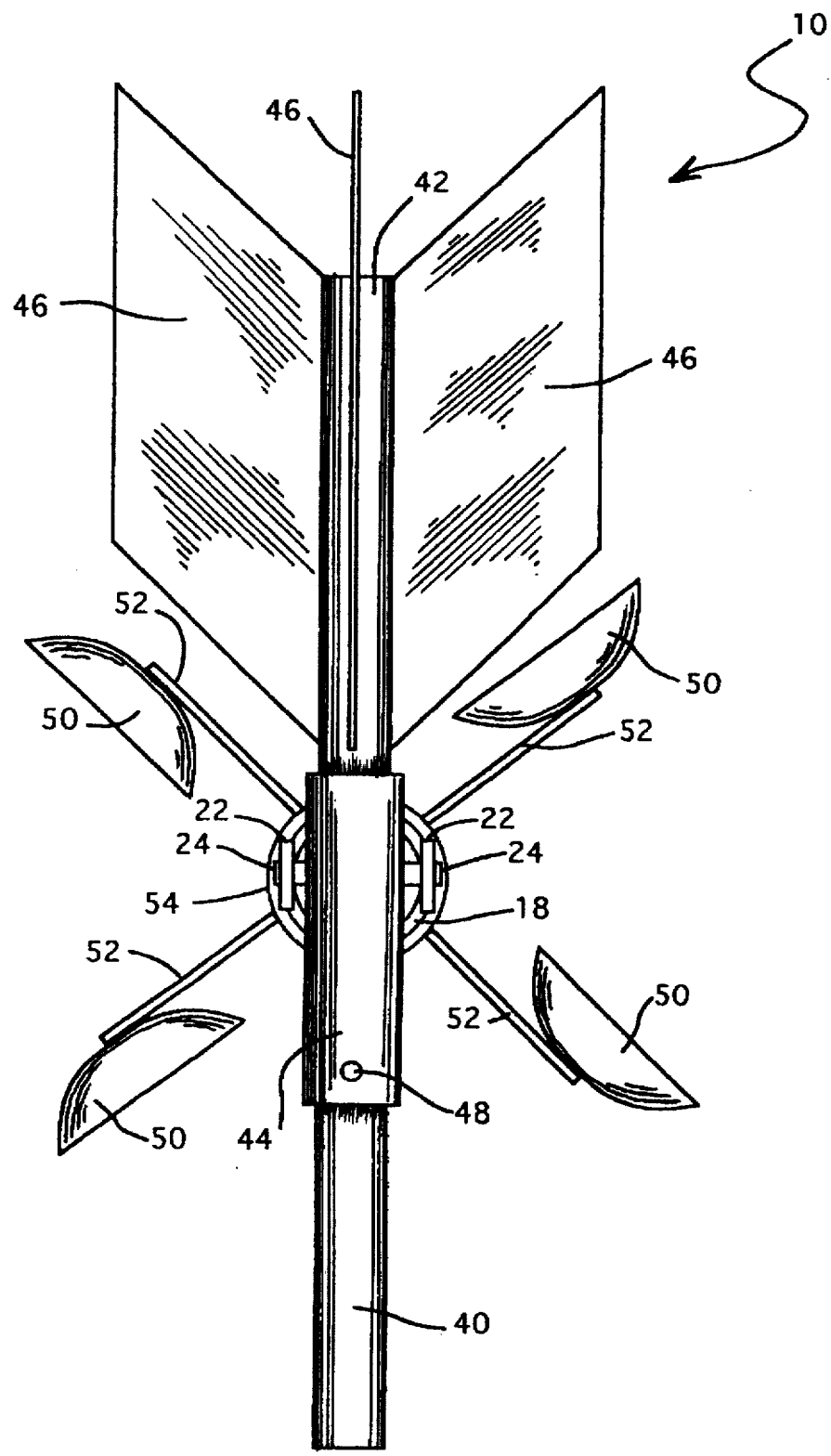
FIG. 3 is a top plan view thereof.
Figure 4:
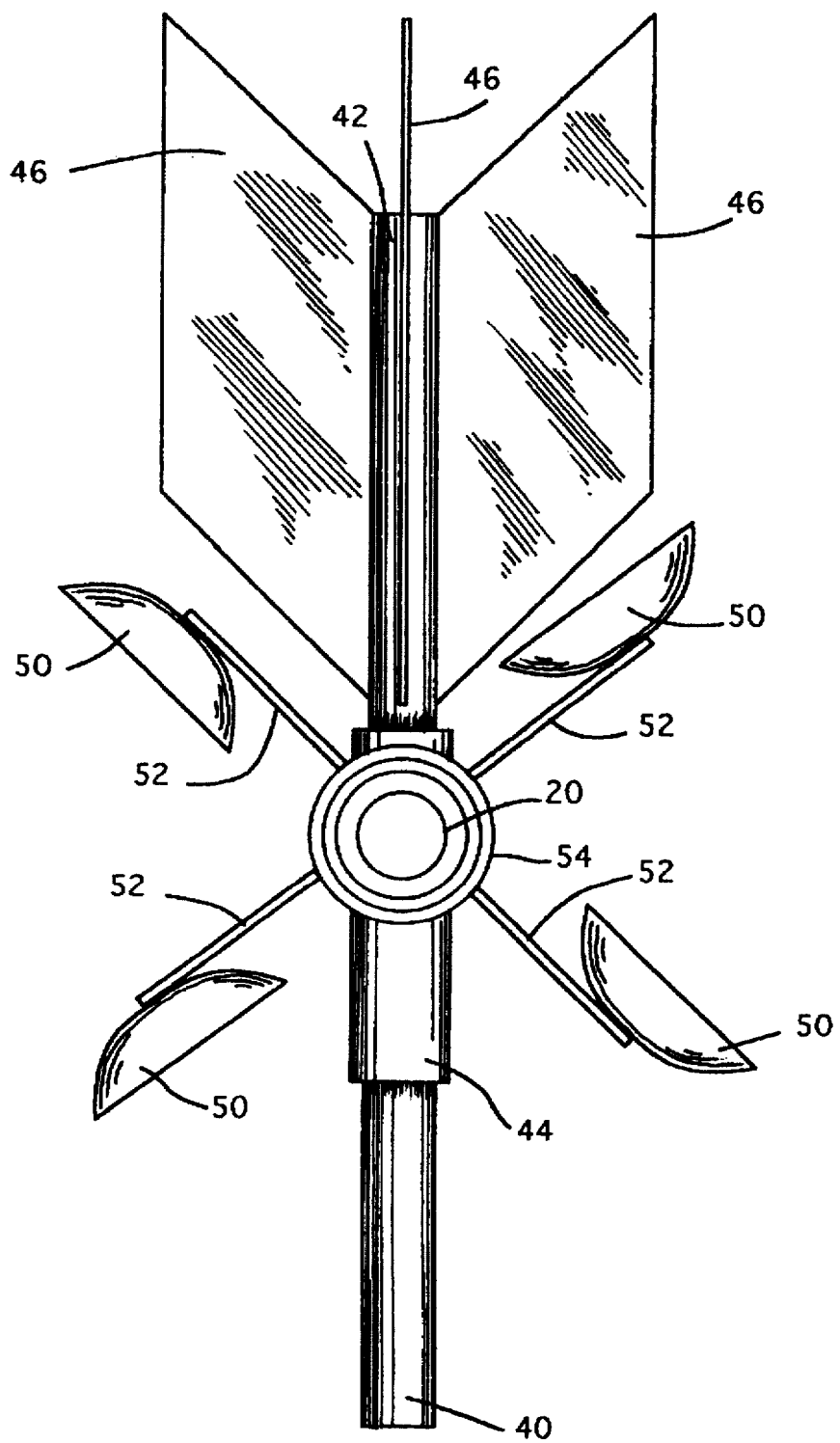
FIG. 4 is a bottom plan view thereof.

Referring now to the drawing figures wherein like reference numerals refer to like parts throughout, there is seen in FIG. 1 a wind speed and direction indicating device, denoted generally by reference numeral 10. Device 10 is seen to generally include a vertically oriented support rod, denoted generally 12, wind direction indicator member, denoted generally 14, and an anemometer 16 for determining wind speed. Device 10 is intended for use by pilots of all kinds of aircraft (powered and unpowered), to assist them in assessing wind conditions at a predetermined location (either a takeoff or landing location).

Figure 5:
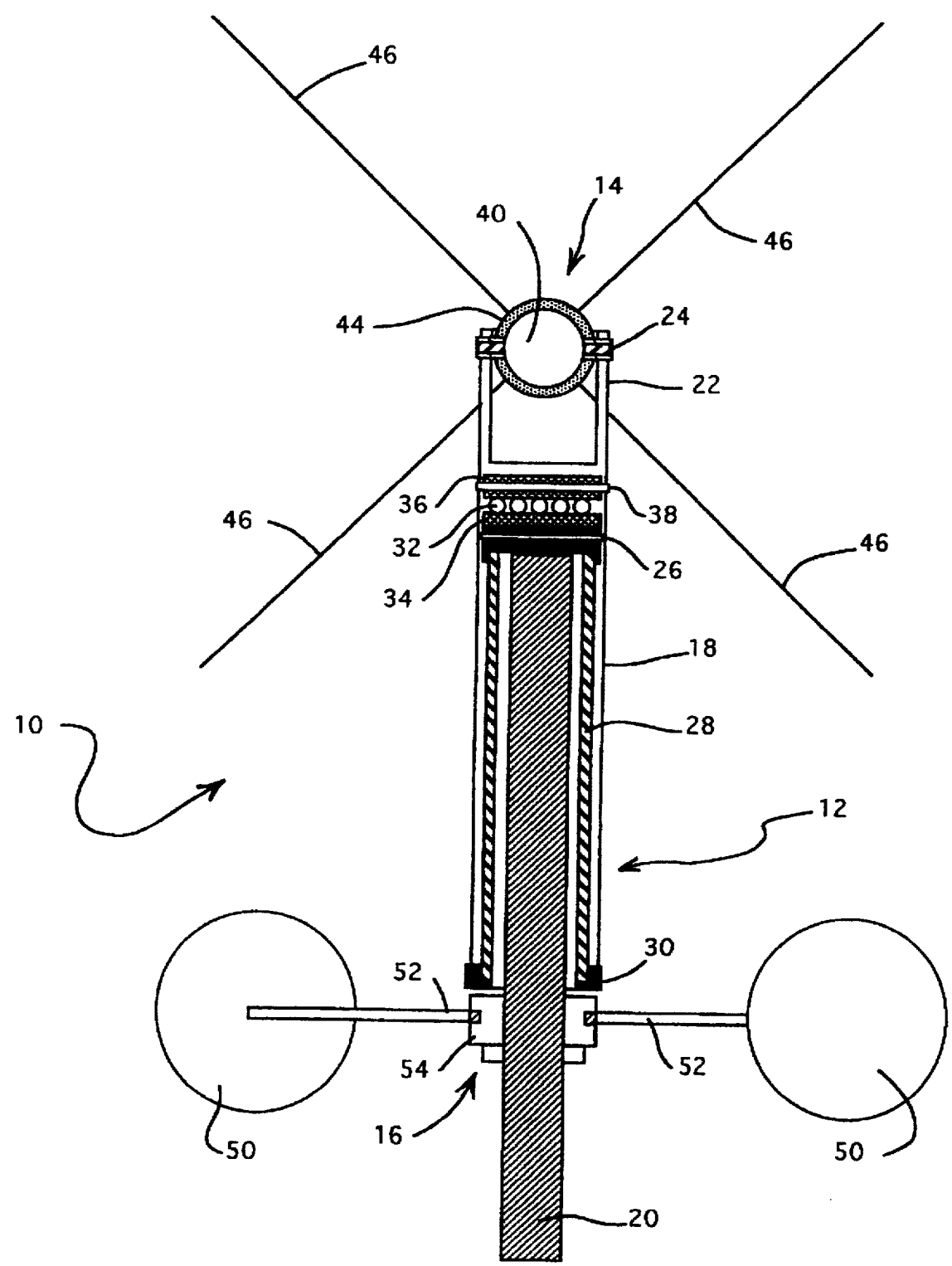
FIG. 5 is a front elevational, cross-sectional view taken along section line 5—5 of FIG. 1.
Figure 6:
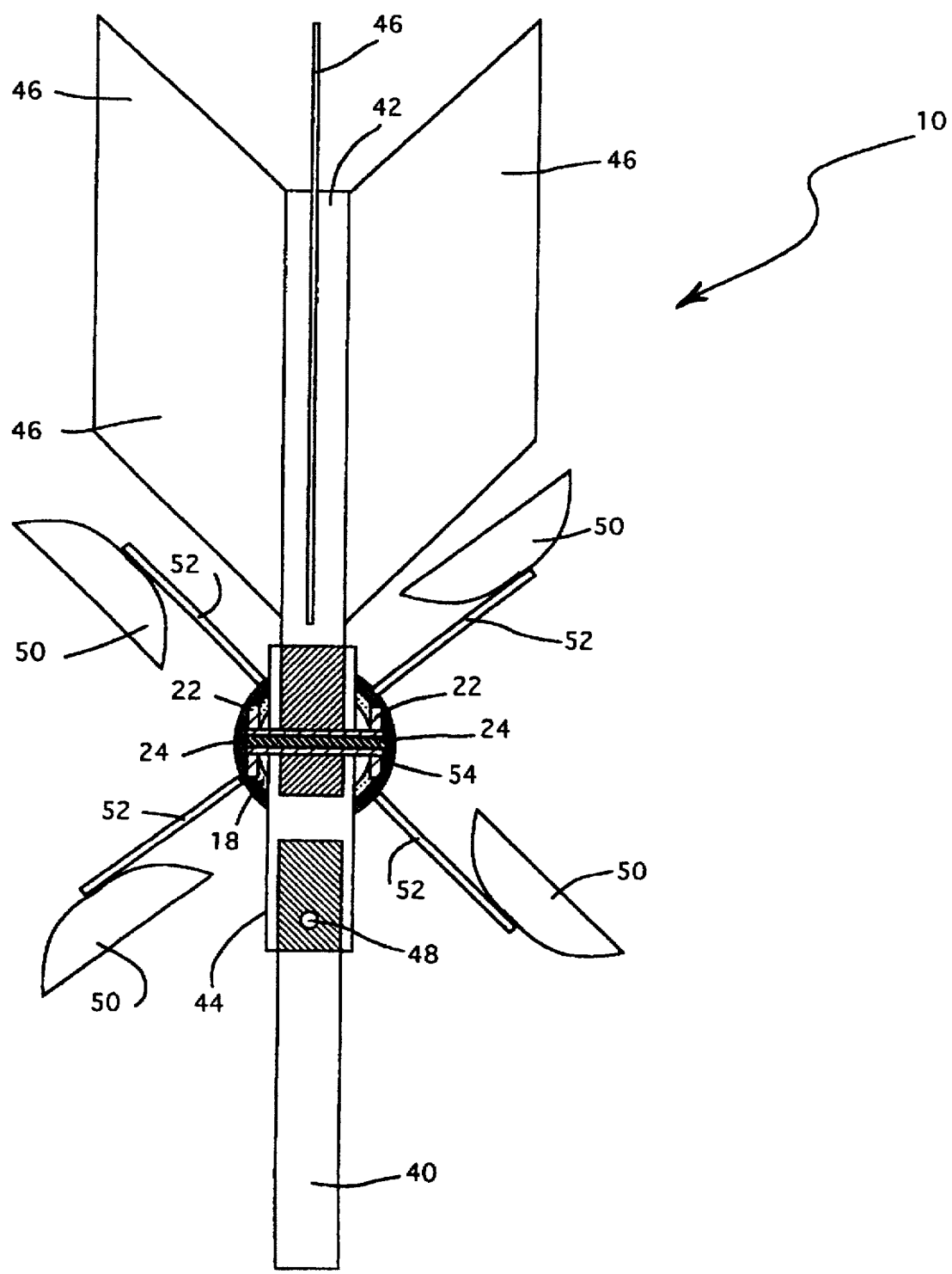
FIG. 6 is a top plan, partial cross-sectional view taken along section line 6—6 of FIG. 1.
Figure 7:
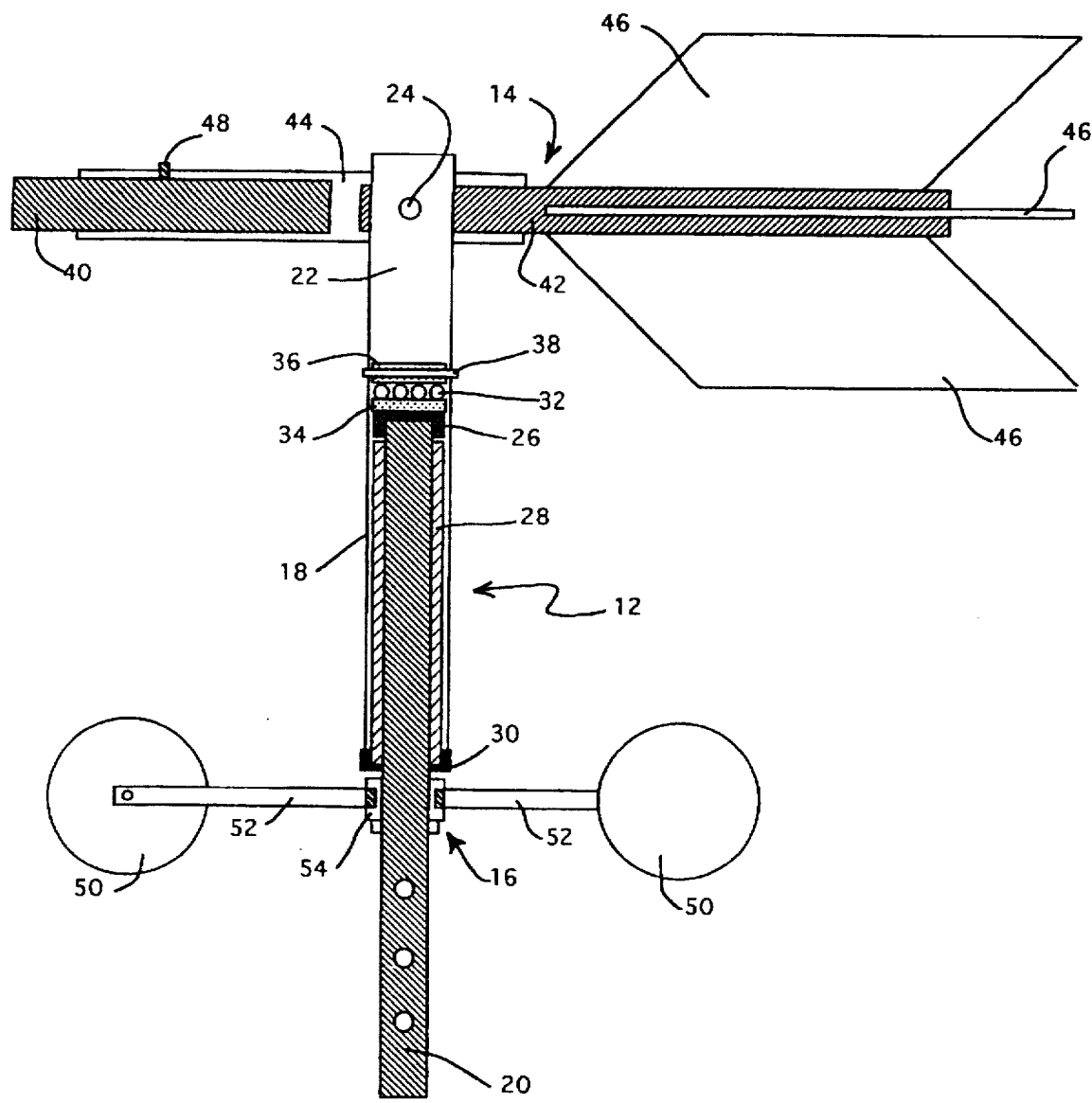
FIG. 7 is a side elevational, cross-sectional view taken along section line 7—7 and section line 7A—7A of FIG. 1.

Support rod 12 is essentially comprised of a generally cylindrical tubular member 18 to which wind direction indicator member 14 is universally pivotally attached, and a fixed rod 20 to which tubular member 18 is rotatably attached. Specifically, wind direction indicator member 14 is attached to a U-shaped bracket 22, integrally formed at the upper end of tubular member 18, by a rivet 24 that acts as a pivot pin. Referring to FIGS. 5 and 7, it is seen that a portion of fixed rod 20 is securely fit within tubular member 18, while its remaining portion extends downwardly from tubular member to ultimately be mounted to the ground or a building. Fixed rod 20 includes an end cap 26 attached to its end inside tubular member 18, and is held fixed by an inner sleeve 28 which extends upwardly into tubular member 18 from a tubular member end cap 30. Inner sleeve 28 ensures that fixed rod 20 will remain concentrically positioned within tubular member 18, and will not interfere with the rotation of tubular member 18 about its longitudinal axis.

The rotation of tubular member 18 is accomplished by a set of ball bearings 32 sandwiched between a pair of nylon bushings 34, 36, all of which are positioned within tubular member 18. Nylon bushing 34 freely rests atop rod end cap 26, and ball bearings 32 sit atop nylon bushing 34. Nylon bushing 36 is positioned above ball bearings 32 and is fixedly attached to tubular member 18 by a rivet 38. Therefore, ball bearings 32 are securely, freely positioned within tubular member 18, thereby permitting nylon bushing 36 to rotate on ball bearings 32 and translate that rotation directly to tubular member 18 to which it is fixedly attached by rivet 38.

Wind direction indicating member 14 is essentially comprised of a first shaft 40, a second shaft 42, and a bridging member 44 which is tubular in shape and acts as a bridge between first shaft 40 and second shaft 42. First shaft 40 is simply an elongated rod with blunt ends which is removably attached to and selectively adjustable with respect to bridging member 44, and serves as a counter-weight to second shaft 42, thereby dynamically balancing device 10. Second shaft 42 is fixedly attached to bridging member 44 by rivet 24 passing therethrough, and includes a plurality of aerodynamically shaped fins 46 equidistantly, radially spaced around its tail end. The planar surface area of fins 46 cut through the wind causing tubular member 18 to orient wind direction indicating member 14 such that first shaft 40 vanes directly into the wind.

To dynamically balance wind direction indicating member 14, as for instance might need to be done if device 10 is mounted on an inclination, first shaft 40 may be appropriately positioned with respect to bridging member 44—either increasing or decreasing the length of the portion which extends outwardly away from bridging member 44. To adjust the positioning of first shaft 40, an adjustment screw 48, which passes through an aperture formed through bridging member 44 and then securely engages first shaft 40, must be loosened enough to take it out of engagement with first shaft 40. First shaft 40 may then be slid further into or out of bridging member 44. When first shaft 40 is at a position such that wind direction indicating member 14, as a whole, is balanced (i.e., member 14 points straight ahead in a horizontal plane when not being affected by wind), adjustment screw 48 may be tightened back into secure engagement with first shaft 40.

Anemometer 16 is conventional, including cups 50 attached at the end of arms 52 which extend horizontally outwardly from, and are radially spaced around a ring member 54 that is rotatably secured to fixed rod 20.

Device 10 provides a mechanism for determining the presence of wind conditions appropriate for launching a glider-type vehicle, such as a hang glider, from an elevated launch site. First, device 10 must be dynamically balanced and mounted near the launch location. The pilot may then visually observe the orientation of wind direction indicating member 14 and the rotational velocity of anemometer 16. When wind direction indicating member 14 begins pitching downwardly, the pilot is forewarned that the air mass at the launch site is lifting. As wind direction indicating member 14 begins to pitch further downward, the pilot is alerted that the air mass is increasingly rising, thereby indicating the presence of optimum take-off characteristics. Moreover, if wind direction indicating apparatus starts pitching upwardly from its orientation the pilot is indicated that the air mass is sinking or rising at a decelerated rate, thereby not providing good take-off characteristics.

Figure 11:
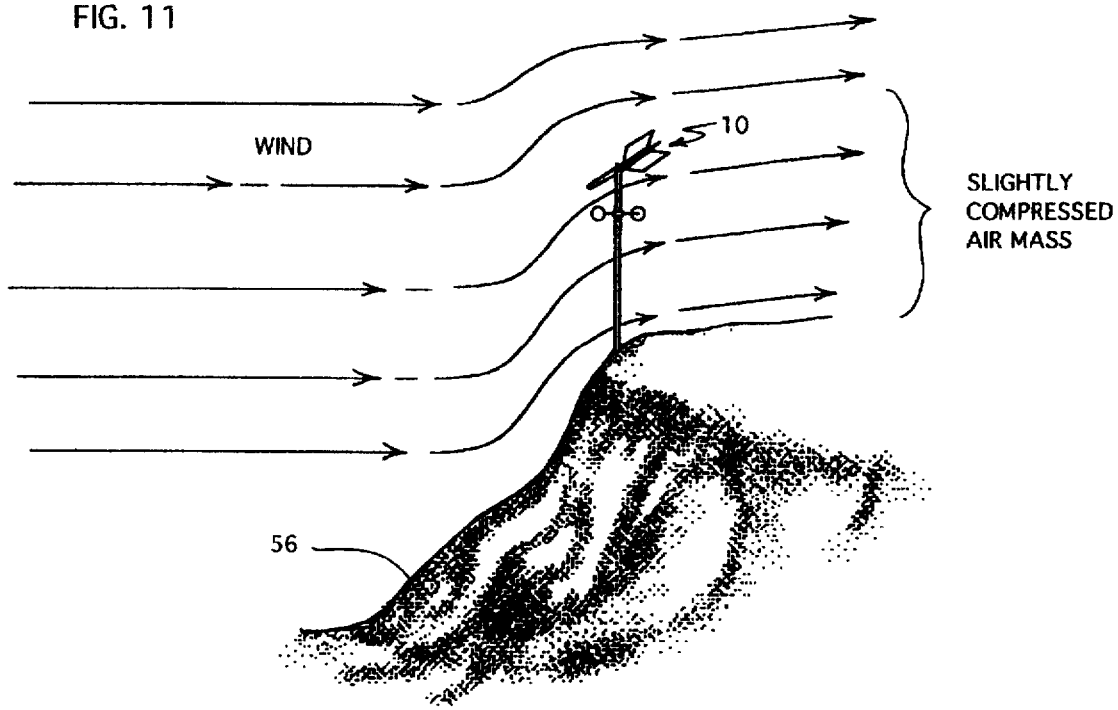
FIG. 11 is a side elevational view of the present invention mounted along a ledge of a cliff and illustrating the wind's effect on the present invention when coming from a first direction.
Figure 12:
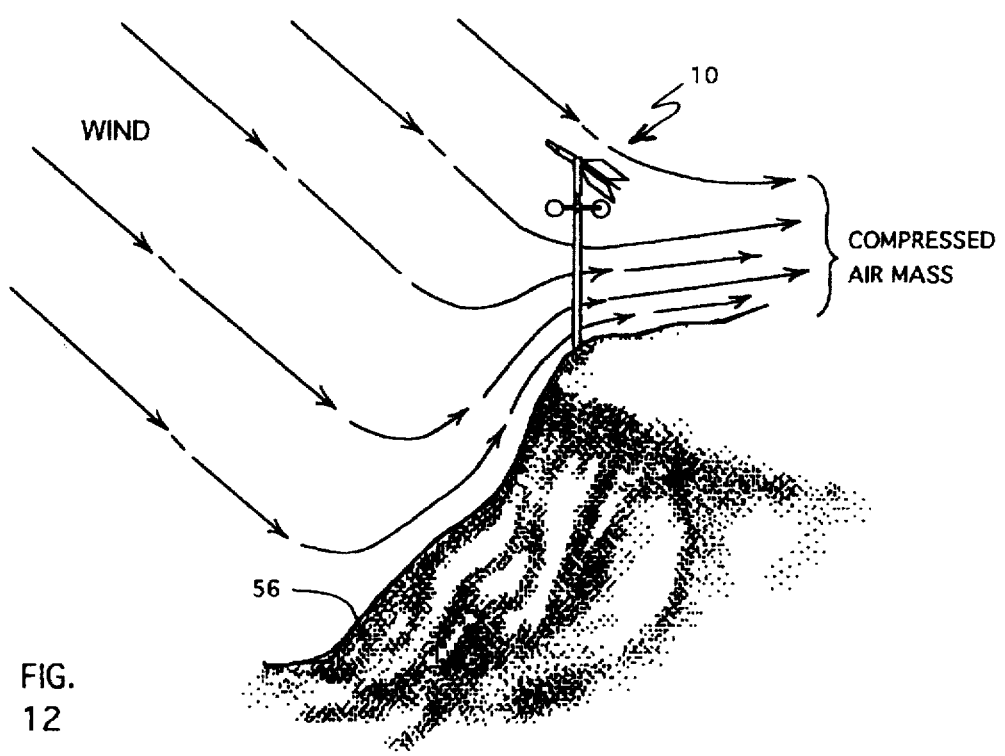
FIG. 12 is a side elevational view similar to FIG. 11 illustrating the wind's effects on the present invention when coming from a second direction.

Referring now to FIGS. 11–14, device 10 is seen mounted a variety of locations, with wind being illustrated by groupings of arrows. In FIGS. 11 and 12, device 10 is mounted along the ledge of a cliff 56. As seen in FIG. 11, the wind is illustrated as blowing essentially straight into cliff 56. However, due to ridge lift, the wind (air mass) blowing straight into the side of cliff 56 is forced up and over the ledge, thereby slightly compressing the air mass close to the ground. Accordingly, the true wind direction at the ledge is causing the air mass to lift. Therefore, device 10 is oriented to point downward indicating the lifting air mass. Due to wind blowing both over and under a wind sock near the ledge under similar wind conditions, the wind sock would indicate essentially straight blowing wind, thus not giving an individual about to launch a hang glider a true indication of the launch conditions.

In FIG. 12, the wind is illustrated as blowing into cliff 12 in a downward direction. This causes the ridge lift effect to greatly increase the compression of the air mass as it passes over the ledge. The combination of the downward blowing air and compressed air cause device 10 to point upwardly, thereby indicating rapidly sinking air. Thus, a hang glider would know not to launch.

Figure 13:
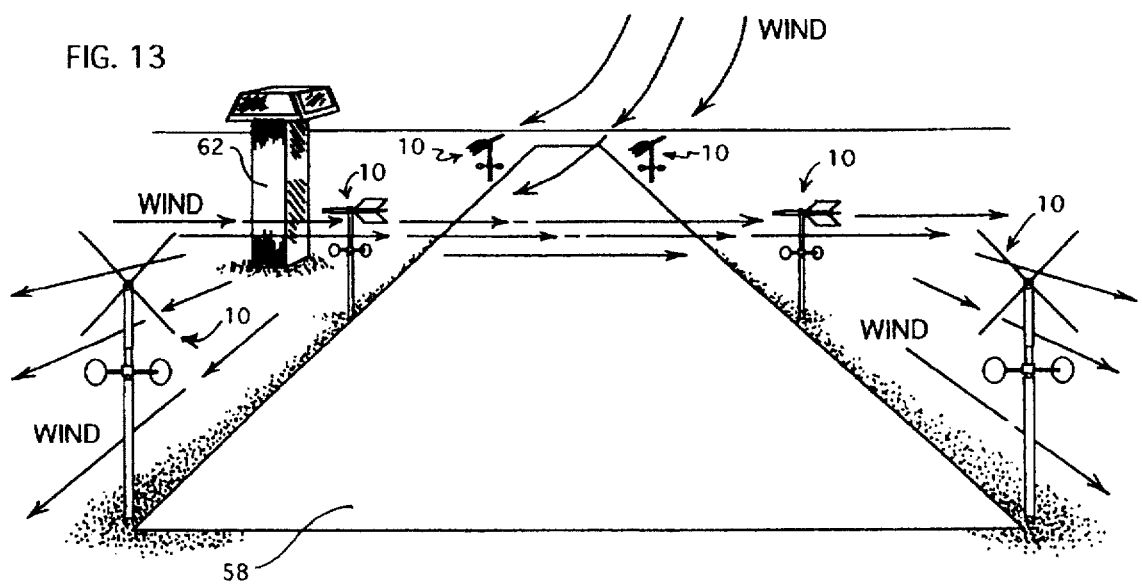
FIG. 13 is a perspective view of a plurality of the present invention mounted along side an airport's runway, and illustrating the wind's effect on the present invention.
Figure 14:
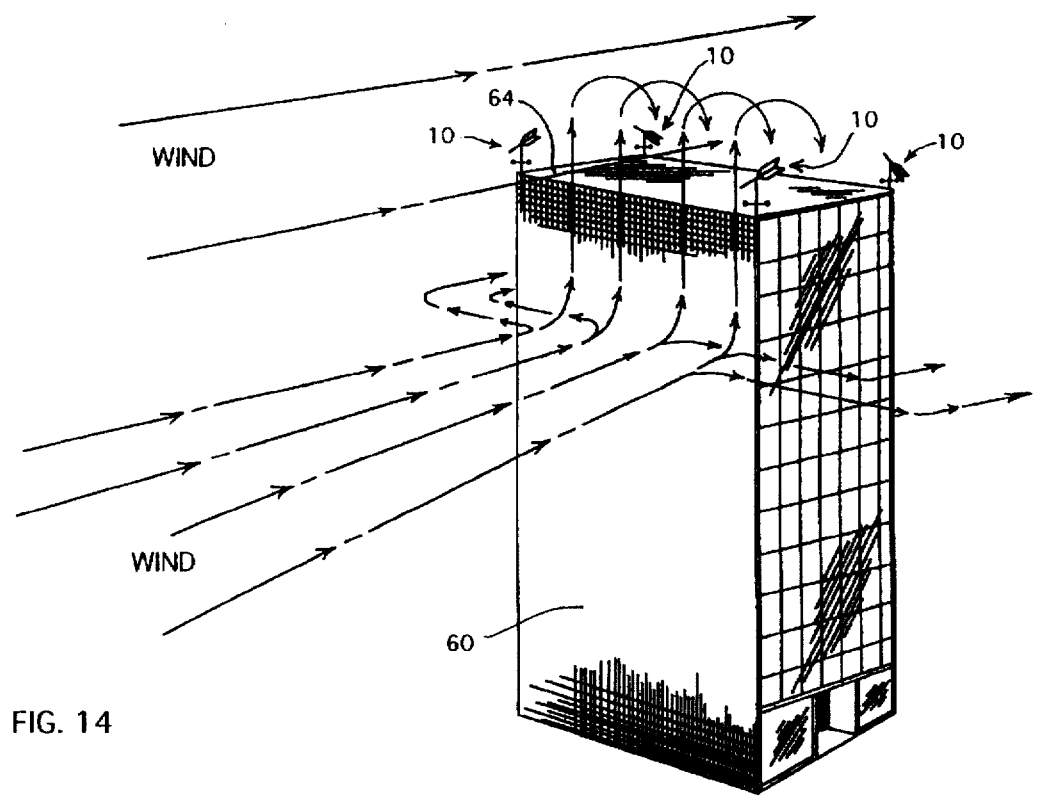
FIG. 14 is a perspective view of a plurality of the present invention mounted on a heliport, and illustrating the wind's effect on the present invention.

FIGS. 13 and 14 show device 10 mounted along a runway 58, and at a heliport 60, respectively. At different points along a runway, the wind will be blowing in different directions due to various turbulent forces, as is indicated by the several groupings of arrows. The wind's direction and speed will be indicated by wind direction indicating members 14 and anemometers 16, respectively. The direction and speed will be relayed, as will be explained hereinafter, from devices 10 to tower 62 which may then relay the information to a plane.

Heliport 60 has similar effects on the wind as a cliff. When wind is blowing in from a particular directions, as indicated by the arrows, the effects at different points along heliport 60 will be different. Therefore, it is necessary to mount devices 10 at the corners of heliport 60 in order to account for wind blowing in from any direction. When wind is blowing essentially straight into heliport 60, as indicated in FIG. 14, the air mass will be forced up and around heliport 60. The air mass going up heliport 60 will be suddenly forced downwardly upon reaching the roof due to the pressure from the wind blowing above heliport 60. Accordingly, devices 10 mounted on opposite sides of heliport 60 will indicate the precise direction of the wind (the directions being quite different in the illustrated example) across the landing area 64. This information can be relayed to a helicopter's pilot to alert him or her as to the wind's true directions, thereby allowing adjustments to be made to the controls in order to compensate for the wind.

Figure 8:
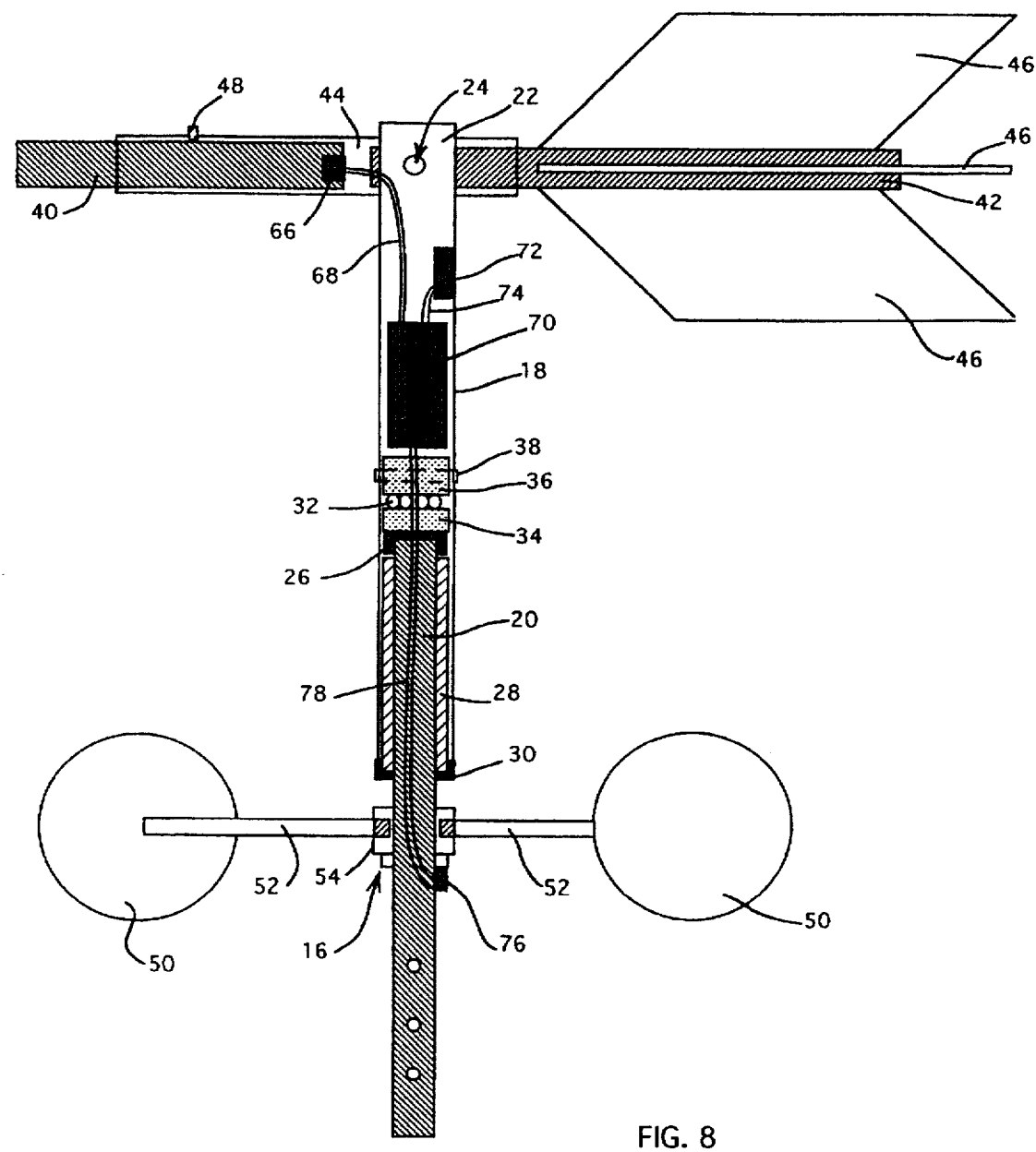
FIG. 8 is the cross-sectional view of FIG. 7 further showing electrical, telemetry components mounted within the device.
Figure 9:
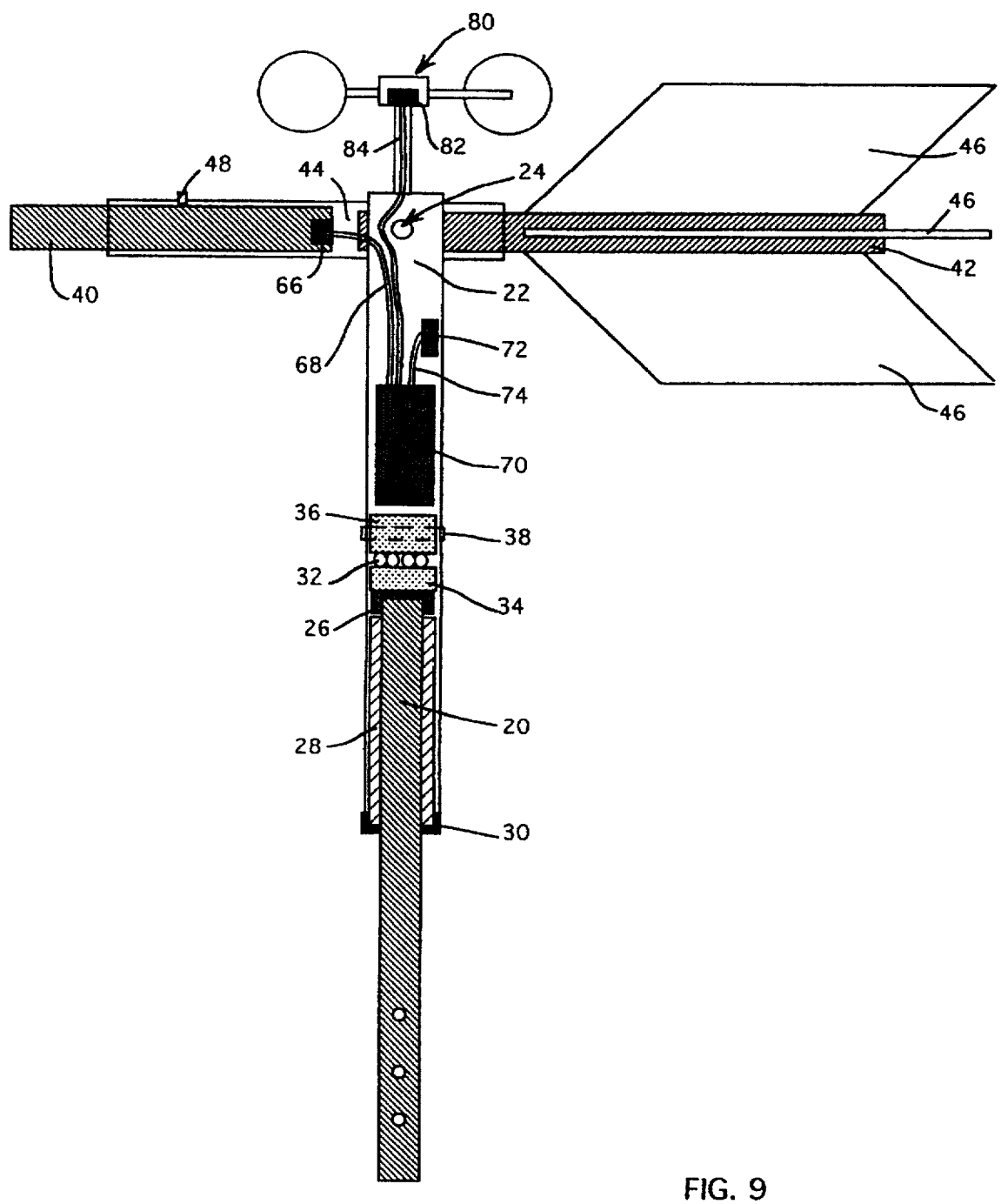
FIG. 9 is the cross-sectional view of FIG. 8 showing a second embodiment, the present invention having an alternate placement of the anemometer.
Figure 10:
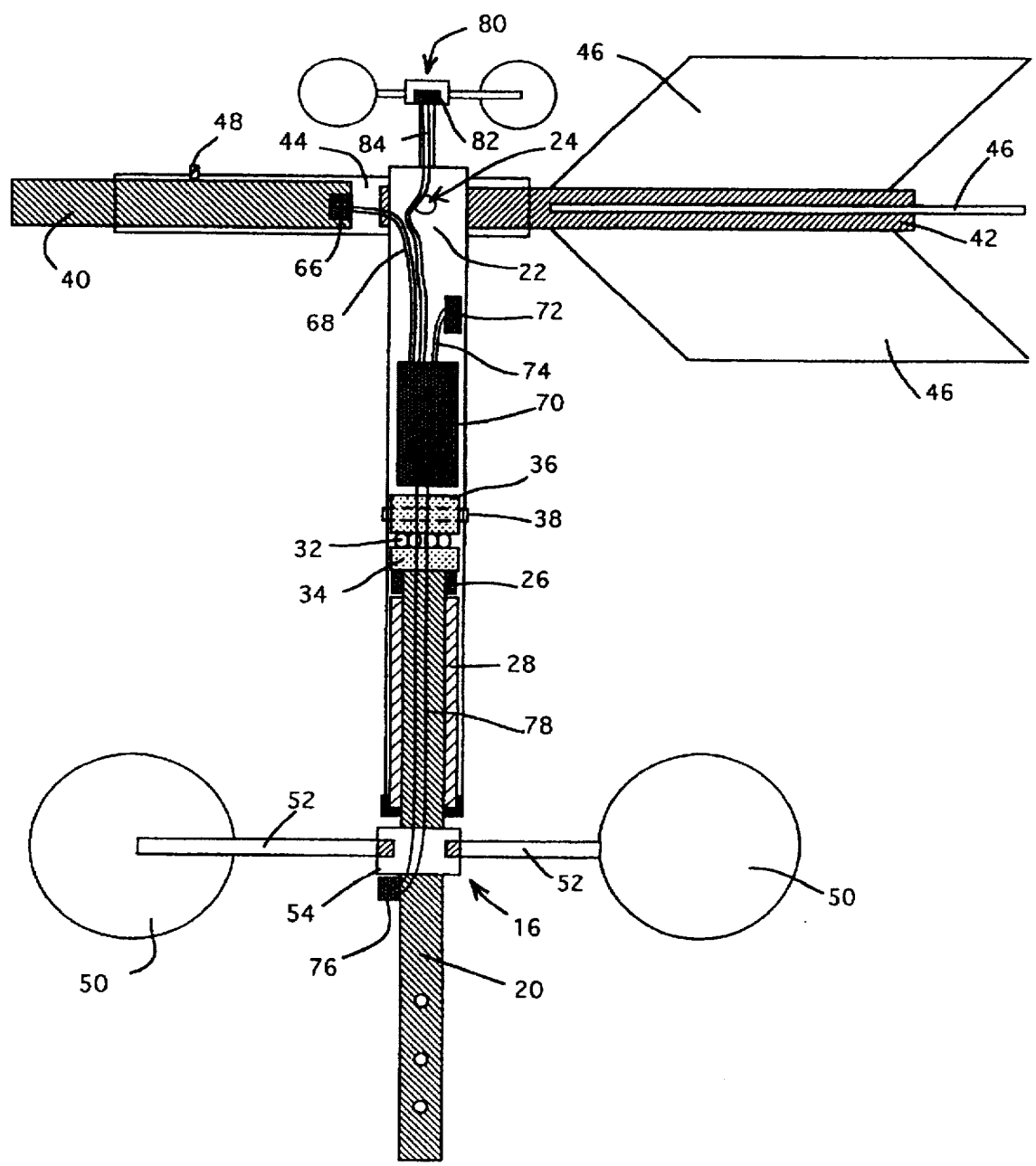
FIG. 10 is the cross-sectional view of FIG. 8 showing a third embodiment, the present invention having first and second anemometer mounted thereto.

Referring now to FIGS. 8–10, there is seen three respective embodiments of device 10 having telemetry equipment mounted therein for relaying directional and speed information to a control tower or directly to a pilot. In FIG. 8, structurally device 10 is identical to device 10 of FIG. 1, and accordingly like reference numerals denote like parts. However, device 10 of FIG. 8 also includes three sensors. Sensor 66 is mounted directly to first shaft 40 to indicate the pitch (vertical) angle of direction indicating member 14. Leads 68 electrically connect sensor 66 to a conventional RF transmitter 70 securely mounted in fixed relation to tubular member 18. A second sensor 72 is securely mounted to the inner wall of tubular member 18 and indicates the yaw (lateral) angle of direction indicating member 14. Leads 74 electrically connect sensor 72 to RF transmitter 70. A third sensor 76 is mounted directly to anemometer 16 and indicates the speed of the wind. Leads 78 electrically connect sensor 76 to RF transmitter 70. Thus, the vertical and lateral directions of the wind, as well as the wind's horizontal speed may be sent to a pilot using the embodiment of FIG. 8.

The embodiment of FIG. 9 is identical to FIG. 8 except that anemometer 16 has been removed and replaced with anemometer 80 which is securely attached to wind direction indicating member 14. Therefore, as wind direction indicating member pitches and yaws into the wind, so will anemometer 80. Accordingly, anemometer 80 will indicate the true wind speed, as opposed to just the horizontal component of the wind as did anemometer 16. A sensor 82 is directly mounted to anemometer 80 to indicate the wind's true speed. Leads 84 electrically connect sensor 82 to RF transmitter 70.

The embodiment of FIG. 10 is a combination of the embodiments of FIGS. 8 and 10. Device 10 in FIG. 10 includes anemometers 16 and 80 securely attached to support rod 20 and wind direction indicating member 14, respectively. Leads 78 and 84 connect sensors 76 and 82, respectively, to RF transmitter 70. Therefore, both the true speed and the horizontal (shearing) component of the wind may be sent to a pilot.

The electrical components utilized in the present invention are conventional, commercially available components.

The present invention should not be limited to the details specified herein, but should extend to the full spirit and scope as defined by the following claims.

What is claimed is:

1. A navigational aid for assessing wind conditions at a predetermined location comprising:
   a) support means fixedly mounted at said predetermined location;
   b) first means mounted to said support means for rotation about a substantially vertical axis to a position visually indicative of horizontal wind direction at said predetermined location
   c) second means mounted to said support means for rotation about a substantially horizontal axis to a position visually indicative of vertical wind direction at said predetermined location;
   e) a shaft mounted to said support means for rotation about both vertical and horizontal axes; and
   f) third means mounted to said shaft and operative to indicate wind velocity at said predetermined location.

2. The navigational aid of claim 1 wherein said first means comprise a shaft mounted to said support means for rotation about said vertical axis, and fin means fixedly connected to said shaft for effecting rotation thereof in response to the horizontal direction of wind incident upon said fin means.

3. The navigational aid of claim 1 wherein said second means comprise a shaft mounted to said support for rotation about said horizontal axis, and fin means fixedly connected to said shaft for effecting rotation thereof in response to the vertical direction of wind incident upon said fin means.

4. The navigational aid of claim 1 wherein said first means comprising first fin means fixedly connected to said shaft for effecting rotation thereof about said vertical axis in response to the horizontal direction of wind incident upon said first fin means, and said second means comprising second fin means fixedly connected to said shaft for effecting rotation thereof about said horizontal axis in response to the vertical direction of wind incident upon said second fin means, whereby the orientation of said shaft and fin means provides a visual indication of horizontal and vertical wind direction.

5. The navigational aid of claim 1 wherein said third means comprises a rotating cup-type anemometer.

6. The navigational aid of claim 5 wherein said shaft is elongated along a first axis and said anemometer is rotatable about a second axis, substantially perpendicular to said first axis.

7. The navigational aid of claim 1 and further including means for generating and transmitting electrical signals commensurate with each of said horizontal wind direction, said vertical wind direction and said wind velocity.

8. The navigational aid of claim 7 wherein said generating and transmitting means are mounted to said support means.

9. The navigational aid according to claim 1 and further comprising fourth means mounted to said support means and operative to indicate wind velocity at said predetermined location.

10. The navigational aid according to claim 9 wherein said fourth means comprises a rotating cup-type anemometer.

11. The navigational aid according to claim 10 wherein said anemometer is mounted for rotation about a substantially vertical axis.

12. The method of determining the presence of wind conditions appropriate for launching a glider-type vehicle from an elevated launch site, said method comprising:
   a) mounting in proximity to and visually observable from said launch site a navigational aid having:
      i) at least one rigid, first structural member elongated along a first axis and movable about and mutually perpendicular to both horizontal and vertical axes to a rotational orientation of said first axis about said vertical axis indicative of horizontal wind direction and about said horizontal axis indicative of vertical wind direction; and
      ii) at least one second structural member mounted to said first structural member for rotation about a second axis at a rotational velocity commensurate with the velocity of wind incident upon said second structural member; and
   b) visually observing the orientation of said first structural member to determine horizontal and vertical wind direction, and visually observing the rotational velocity of said second structural member to determine wind velocity.

13. The method of claim 12 wherein said vehicle is a hang-glider and said visual observations are made by the pilot of said hang-glider at said launch site prior to launch of said hang-glider.

14. The method of claim 12 wherein said at least one second structural member is a cup-type anemometer.

* * * * *

UNITED STATES PATENT AND TRADEMARK OFFICE
CERTIFICATE OF CORRECTION

PATENT NO. : 5,639,963
DATED : 6/17/97
INVENTOR(S) : George Allan Sustare, Jr.

It is certified that error appears in the above-indentified patent and that said Letters Patent is hereby corrected as shown below:

On the title page, item [57] should read as follows:

Abstract

A navigational aid for assessing fluid conditions, such as wind, at a predetermined location. The device is comprised of an assembly including a vertically oriented support member, a vaning member rotatably attached to the support member for pivotal movement about a horizontal axis to indicate the vertical components of the fluid, a member attached to the support member for rotation about a vertical axis to indicate the horizontal components of the fluid, and an anemometer operably attached to the support member for indicating lateral wind speed. Alternatively, a second anemometer may be mounted to the vaning member to indicate wind speed. Also, electrical transmission components may be operatively mounted within the apparatus for relaying the direction/speed data to a remote party.

Signed and Sealed this

Fifth Day of August, 1997

*Attest:*

*Attesting Officer*

BRUCE LEHMAN

*Commissioner of Patents and Trademarks*